United States Patent Office 3,137,727
Patented June 16, 1964

3,137,727
4-AMINOMETHYLCYCLOHEXANEMETHANOL
Edward U. Elam and James E. Poe, Kingsport, Tenn., assignors to Eastman Kodak Company, Rochester, N.Y., a corporation of New Jersey
No Drawing. Filed July 1, 1960, Ser. No. 40,188
1 Claim. (Cl. 260—563)

This invention relates to the novel compound 4-aminomethylcyclohexanemethanol, and a method for the preparation thereof.

There have been many attempts to find a new alcohol which can be used as a modifying or supplementing agent to make polyesters and polyester-amides of the terephthalate ester-diol type described in U.S. Patent No. 2,901,466 that are easier to spin into more dye-acceptable fibers. However, up until the present time no such economical modifying agent fulfilling these requirements and satisfying the additional requirement of economics has been found.

It is accordingly an object of this invention to provide a novel alcohol useful in the preparation of linear polyesters and polyester-amides.

It is also an object of this invention to provide a novel aminoalcohol useful in the preparation of polyester fibers which are more dye-acceptable.

It is a further object of this invention to provide an aminoalcohol which, when used in the preparation of polyesters and polyester-amides, will increase the ease of spinning said polyesters and polyester-amides and impart excellent dye-acceptability to the fibers produced therefrom.

It is a still further object of this invention to provide a novel aminoalcohol useful in the preparation of polymers of high melting temperatures, good chemical and physical stability and excellent resistance to heat distortion and hydrolysis due to weathering and the like.

It is still another object of this invention to provide a method for the preparation of 4-aminomethylcyclohexanemethanol, a novel compound useful in the preparation of polyester and polyester-amide fibers.

Other objects of this invention will be apparent to one skilled in the art from the description and claims which follow.

This invention consists of a novel aminoalcohol 4-aminomethylcyclohexanemethanol of the formula

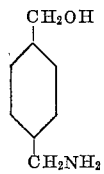

which we have found surprisingly to be a useful intermediate in the preparation of linear polyesters and polyester-amides and of a method for the preparation thereof. The unsaturated counterpart of our novel compound, the benzyl amine or benzyl alcohol, p-xylylene-α-hydroxy-α'-amine, having the formula

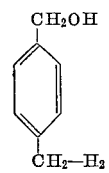

has been found to be relatively ineffective in the production of such polyesters and such polyester-amides as those referred to hereinabove. The reason for this was thought to be the presence of a hydroxymethyl group attached to the ring, which caused the compound to undergo decomposition when heated under polymerization conditions in the presence of conventional ester-interchange catalysts in such a manner as to form benzyl ethers and carbon dioxide and a small amount of an undesirable low-viscosity, low-melting polymer.

It was therefore very surprising to find that the compound 4-aminomethylcyclohexanemethanol, despite the fact that one difference between its formula and the p-xylylene-α-hydroxy-α'-amine is the saturation of the ring, could not only be effectively used in the preparation of such polyesters and polyester-amides but would also produce a polymer capable of being easily spun into fibers of enhanced dye-acceptability. Reduction of the unsaturated homologue of 4-aminomethylcyclohexanemethanol unexpectedly produces hexahydroxylene as the main product instead of the aminoalcohol. Surprisingly also, the aminoalcohol of our invention undergoes none of the typical reactions of a benzyl amine or benzyl alcohol derivative such as the above-mentioned unsaturated homologue, p-xylylene-α-hydroxy-α'-amine. We have found unexpectedly, however, that by hydrogenating either 4-cyanocyclohexanecarboxaldehyde or 4-hydroxymethylcyclohexanecarbonitrile both of which can be prepared by the hydroformylation of 3-cyclohexene-1-carbonitrile with carbon monoxide and hydrogen in the presence of a suitable hydroformylation catalyst, we can obtain the 4-aminomethylcyclohexanemethanol of this invention. Suitable hydroformylation catalysts for our purposes are the carbonyl-forming metals of Group VIII of the periodic table and compounds thereof, the preferred catalysts being weak acid salts of cobalt, cobalt carbonyls, or finely divided metallic cobalt. Suitable hydroformylation temperatures are from about 90° C. to about 250° C., the preferred operating range being 120° C. to 200° C. Raney nickel and Raney cobalt are preferred hydrogenation catalysts for the hydrogenation of the 4-cyanocyclohexanecarboxaldehyde, although other conventional hydrogenation catalysts such as nickel, platinum, palladium and ruthenium can also be used. In the preferred embodiment of our method for the preparation of 4-aminomethylcyclohexanemethanol, no ammonia is added during the hydrogenation of the 4-cyanocyclohexanecarboxaldehyde. Although we are unable to understand exactly why or how we obtain 4-aminomethyl cyclohexanemethanol by our preferred embodiment, we hypothesize that the omission of ammonia from the reaction system prevents the formation of substantial amounts of the diamine, 1,4-cyclohexane bis(methylamine). Apparently when ammonia is present, both the nitrile or cyano group and the aldehyde group are reduced, causing the formation of substantial amounts of the diamine 1,4-cyclohexanebis-(methylamine), thus decreasing markedly the yield of 4-aminomethylcyclohexanemethanol.

We have found that 4-aminomethylcyclohexanemethanol can also be prepared by treating 1,4-cyclohexanedimethanol with ammonia in the presence of conventional hydrogenation catalysts such as Raney nickel or Raney cobalt or dehydrogenation catalysts such as alumina and silica gel, either separately or in combination with each other. By this method, however, the primary product is 1,4-cyclohexane(bismethylamine) and the yield of 4-aminomethylcyclohexanemethanol is generally lower. When this procedure is used, the process can be carried out either in an appropriate pressure vessel under autogenous pressure or at substantially atmospheric pressure in the vapor phase at temperatures from near or just above the boiling point of the 1,4-cyclohexane-dimethanol to about 500° C The reaction will proceed more efficiently when an excess of at least 1.5 moles of ammonia per hydroxyl is employed to suppress the formation of polyamines. The reaction temperature should be at least about 200° C. in order for the reaction to proceed at reasonable rates. To minimize the formation of the diamine, the reaction temperature should be held within the lower part of the above-mentioned range and the time for the reaction held to a minimum.

Other more lengthy methods of producing 4-aminomethylcyclohexanemethanol which we have found to be less efficient than our preferred embodiment described hereinabove involve, in general, progressive steps of reduction of various other cyclohexane ring compounds. For example, 4-carbomethoxycyclohexane-carbonitrile can be reduced in the presence of a suitable catalyst such as Raney ickel or cobalt to methyl 4-aminomethylcyclohexane-carboxylate, which can be then further reduced over a copper chromite or modified copper chromite catalyst to 4-aminomethylcyclohexanemethanol. Correspondingly, methyl 4-hydroxymethylcyclohexanecarboxylate can be changed to 4-hydroxymethylcyclohexanecarbonitrile in the presence of an alumina or other appropriate catalyst, and the 4-hydroxymethylcyclohexanecarbonitrile further reduced over a Raney nickel or other suitable catalyst in the presence of ammonia to the 4-aminomethylcyclohexanemethanol.

The invention is illustrated by the following examples of certain preferred embodiments thereof.

*Example 1.—Preparation of 4-Cyanocyclohexanecarboxaldehyde*

A solution of 214 g. (2 moles) of 3-cyclohexene-1-carbonitrile and 10 g. of dicobalt octacarbonyl in 600 ml. of benzene was placed in a 1680-ml. stainless steel rocking autoclave which was purged with hydrogen, then charged to 800 p.s.i. with hydrogen, then with a 1:1 mixture of carbon monoxide and hydrogen to a total pressure of 2000 p.s.i. The autoclave was then heated to 130° C. and sufficient carbon monoxide-hydrogen mixture added to maintain the pressure at 3000 p.s.i. until the reaction ceased. The 4-cyanocyclohexanecarboxaldehyde product was collected by fractional distillation.

*Example 2.—Preparation of 4-Aminomethylcyclohexanemethanol From 4-Cyanocyclohexanecarboxaldehyde*

A solution of 71 g. of 4-cyanocyclohexanecarboxaldehyde produced according to the procedure of Example 1 in 50 ml. of methanol was placed in a stainless steel rocking autoclave together with 5 g. of Raney nickel. Hydrogen was then pressed in to a total pressure of about 1,000 p.s.i. The autoclave was then heated to 125° C., and hydrogen was charged as necessary to maintain a pressure of 1,500 p.s.i. until no further absorption took place. The product was removed from the autoclave, filtered, and fractionated, giving a 70% yield of 4-aminomethylcyclohexanemethanol having a boiling point of 127–130° C. at 4 mm. Hg pressure and a refractive index ($n_D^{20}$) of 1.4985.

*Example 3.—Preparation of 4-Aminomethylcyclohexanemethanol From 4-Cyanocyclohexanecarboxaldehyde in the Presence of Ammonia*

An autoclave containing 113 g. of 4-cyanocyclohexanecarboxaldehyde and 20 g. of alcoholic Raney nickel catalyst was charged with approximately 145 g. of ammonia (230–250 ml.). The 4-cyanocyclohexanecarboxaldehyde was reacted at a temperature ranging from 90° C. to 100° C. and at a hydrogen pressure of about 3,000 p.s.i. until hydrogen absorption ceased and substantially all of the 4-cyanocyclohexanecarboxaldehyde was hydrogenated. The product was filtered and the solvent removed. The residue was distilled under high vacuum, the bulk of the material distilling at a temperature of 105–109° C. at a pressure of 3 mm. of mercury. 67 g. of a product consisting primarily of 4-aminomethylcyclohexanemethanol having an index of refraction ($n_D^{20}$) of 1.4878 was thus formed.

The following example illustrates the utility of the novel 4-aminomethylcyclohexanemethanol of this invention in the preparation of strong polyester fibers of enhanced dye affinity.

*Example 4.—Use of 4-Aminomethylcyclohexanemethanol in Polyester*

A flask equipped with a stirrer, nitrogen inlet, thermometer, and distilling head was charged with 1 mole of terephthalic acid and 0.25 mole of 4-aminomethylcyclohexanemethanol. The mixture was stirred under nitrogen and heated at 180–190° C. for 2 hours, during which time 2 ml. of methanol were evolved. The solution was cooled, and 0.24 mole of 1,4-cyclohexanedimethanol (containing 30% methanol), 0.3 ml. of a 28.4% solution of titanium tetraisopropoxide in n-butanol, and 1.0 ml. of a 1.5% solution of lithium methoxide in methanol were added. The mixture was reheated and stirred under nitrogen for 30 minutes at 180–190° C. and then for 30 min. at 200–210° C. At the end of this time, 34 ml. of methanol had evolved, and the reaction mass had solidified. The temperature was raised to 285° C., and when the reaction mass was completely molten, a vacuum of less than 1 mm. of mercury was applied for 5 minutes. The prepolymer was protected with a nitrogen atmosphere and poured into water. The prepolymer, which melted at 263–270° C., was ground to pass a 40-mesh screen and heated at 263° C. at a pressure of 0.07 mm. of mercury for 6 hours. The final polymer had a viscosity of 0.98 and was readily melt spun to strong fibers which showed a strong affinity for acid dyes.

Thus, we have invented the novel and unobvious compound, 4-aminomethylcyclohexanemethanol, useful in the preparation of polyester fibers of enhanced strength and dyeability.

*Example 5.—Preparation of 4-Hydroxymethylcyclohexanecarbonitrile*

A solution of 321 g. (3 moles) of 3-cyclohexane-1-carbonitrile and 30 g. of dicobalt octacarbonyl in 1500 ml. of benzene was placed in a 4450-ml. stainless steel rocking autoclave which was purged with nitrogen, then charged to 800 p.s.i. with hydrogen, then with a 1:1 mixture of hydrogen and carbon monoxide to a total pressure of 2000 p.s.i. The autoclave was then heated to 140° C. and sufficient carbon monoxide-hydrogen mixture was added to maintain the pressure at 3000 p.s.i. until the reaction ceased. The reaction time was approximately seven and one half hours. The product consisting of 4-hydroxymethylcyclohexanecarbonitrile with a small amount of 4-cyanocyclohexanecarboxaldehyde was collected by fractional distillation.

*Example 6.—Preparation of 4-Aminomethylcyclohexanemethanol from 4 - Hydroxymethylcyclohexanecarbonitrile*

A solution of 70 g. (0.5 mole) of 4-hydroxymethylcyclohexanecarbonitrile, produced according to Example 5, in 100 ml. of ethanol was placed in a stainless steel rocking autoclave together with 10 g. of Raney nickel and 34 g. (2 moles) of ammonia were added. Hydrogen was then added to a total pressure of 3000 p.s.i. The reaction mixture was heated to 75° C. and hydrogen was charged as necessary to maintain the pressure at 3000 p.s.i. until no further absorption took place. The product was removed from the autoclave, filtered and fractionated, giving a 75% yield of 4-aminomethylcyclohexanemethanol having a boiling point of 125–130° C. at 4 mm. of Hg pressure and a refractive index ($n_D^{20}$) of 1.4985.

Although the invention has been described in detail with reference to preferred embodiments thereof, it will be understood that variations and modifications can be effected within the spirit and scope of the invention as described hereinabove and as defined by the appended claims.

We claim:

As a composition of matter 4-aminomethylcyclohexane-methanol having an index of refraction ($n_D^{20}$) of about 1.4878.

References Cited in the file of this patent

UNITED STATES PATENTS

| | | |
|---|---|---|
| 2,319,575 | Agens | May 18, 1943 |
| 2,490,005 | Jayne et al. | Nov. 29, 1949 |
| 2,550,646 | Senkus | Apr. 24, 1951 |
| 2,557,560 | Peck | June 19, 1951 |
| 2,818,431 | Beegle | Dec. 31, 1957 |
| 2,831,027 | Pfister et al. | Apr. 15, 1958 |
| 2,894,038 | Bartlett et al. | July 7, 1959 |

FOREIGN PATENTS

| | | |
|---|---|---|
| 878,349 | Germany | June 1, 1953 |
| 902,491 | Germany | Jan. 25, 1954 |
| 785,108 | Great Britain | Oct. 23, 1957 |

OTHER REFERENCES

Ferber: Ber. Deut. Chem., vol. 62, pp. 183–195 (1929).
Natta et al.: J.A.C.S., vol. 74, pp. 4496–4498 (1952).
Natta et al.: J.A.C.S., vol. 76, pp. 4049–4050 (1954).
Noland et al.: J. Org. Chem., vol. 22, pp. 695–697 (1957).
Skinner: J.A.C.S., vol. 79, pp. 2843–2846 (1957).
LeBel: J.A.C.S., vol. 81, pp. 6334–6335 (1959).

UNITED STATES PATENT OFFICE
CERTIFICATE OF CORRECTION

Patent No. 3,137,727  June 16, 1964

Edward U. Elam et al.

It is hereby certified that error appears in the above numbered patent requiring correction and that the said Letters Patent should read as corrected below.

Column 1, lines 63 to 70, the formula should appear as shown below instead of as in the patent:

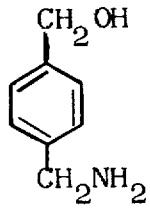

column 3, line 15, for "ickel" read -- nickel --;

Signed and sealed this 9th day of February 1965.

(SEAL)
Attest:

ERNEST W. SWIDER
Attesting Officer

EDWARD J. BRENNER
Commissioner of Patents